(12) United States Patent
Sakiyama

(10) Patent No.: US 11,249,212 B2
(45) Date of Patent: Feb. 15, 2022

(54) METHOD OF SEPARATION EVALUATION OF ACOUSTIC ANISOTROPY AND HETEROGENEITY

(71) Applicant: Schlumberger Technology Corporation, Sugar Land, TX (US)

(72) Inventor: Naoki Sakiyama, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 32 days.

(21) Appl. No.: 16/827,871

(22) Filed: Mar. 24, 2020

(65) Prior Publication Data
US 2021/0302610 A1 Sep. 30, 2021

(51) Int. Cl.
*G01V 1/34* (2006.01)
*G01V 1/36* (2006.01)

(52) U.S. Cl.
CPC .............. *G01V 1/345* (2013.01); *G01V 1/364* (2013.01); *G01V 2210/47* (2013.01); *G01V 2210/626* (2013.01); *G01V 2210/74* (2013.01)

(58) Field of Classification Search
CPC .. G01V 1/345; G01V 1/364; G01V 2210/626; G01V 2210/74; G01V 2210/47
See application file for complete search history.

(56) References Cited

U.S. PATENT DOCUMENTS 8,547,788 B2 10/2013 Wang et al.
2014/0019058 A1* 1/2014 Donderici ............... G01V 1/28
702/17

OTHER PUBLICATIONS

Syresin et al., Characterizing Borehole Stress Effects with Ultrasonic Slowness Measurements, Oct. 11-12, 2017, The 23rd Formation Evaluation Symposium of Japan, 7 pp. (Year: 2017).*
One Petro Search Results, May 19, 2021, 11 pp. (Year: 2021).*

* cited by examiner

*Primary Examiner* — Toan M Le

(57) ABSTRACT

A method for displaying slowness data after defects of anisotropy and heterogeneity have been removed includes visually depicting a slowness image on a computer monitor in which the slowness image includes a log of slowness values at a plurality of depths of a wellbore and a plurality of azimuth angles about a periphery of the wellbore. The image is processed via filtering such as with a bandpass filter. The filter may be obtained via fitting a periodic function to the slowness values at each depth or via a selected periodicity value and center angle. A resultant image is displayed.

17 Claims, 11 Drawing Sheets

METHOD OF SEPARATION EVALUATION OF ACOUSTIC ANISOTROPY AND HETEROGENEITY

CROSS-REFERENCE TO RELATED APPLICATIONS

None.

FIELD OF THE DISCLOSURE

Aspects of the disclosure relate to evaluation of geological data. More specifically, aspects of the disclosure relate to a method of separation and evaluation of acoustic data related to anisotropy and heterogeneity.

BACKGROUND

In recovery operations for hydrocarbon reservoirs, detailed evaluation of seismic or acoustic data is of paramount importance. In conventional drilling apparatus, seismic or acoustical data is obtained in order to allow a driller to more accurately place a wellbore within a hydrocarbon bearing formation to maximize recovered hydrocarbons. As drilling costs can easily cost vast sums of money, achieving a desired rate of return on investment can determine if a wellbore is to be drilled.

Conventional methods for conducting acoustic research for a wellbore include generating a sound or tone from a seismic or acoustical transmitter, reflecting the sound of a single or multiple geological sources, receiving the reflected sound, and displaying the data on a graph for an operator. While having reflection data for review is beneficial, the reflection data itself is corrupted wherein a true picture of image data is not displayed for the driller. The reflected data contains combined effects of anisotropy of the geological stratum as well as heterogeneity. Conventional apparatus present this mixed data, and a driller is never sure of the true geological stratum being evaluated and potentially encountered.

There is a need to provide apparatus and methods that separate out corrupted or false data as well as being are easy to operate. These improved apparatus should be similar to conventional apparatus and methods of data acquisition currently performed at rig sites world-wide.

There is a further need to provide apparatus and methods that do not have the drawbacks discussed above, such as mixed data images potentially misleading drillers as to the presence and/or magnitude of hydrocarbons stored underground.

There is a still further need to reduce economic costs associated with operations and apparatus described above with conventional tools and apparatus and minimize the risks to drilling operations for drilling wellbores that are below expected hydrocarbon recovery amounts and rates.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one embodiment, a method is disclosed. The method may comprise visually depicting a slowness image on a computer monitor, wherein the slowness image has a series of depths and calculating a periodicity and a phase shift of slowness variation as a function of borehole azimuth at each of the depths of the slowness image. The method may further comprise calculating a slowness variation of the slowness image and visually depicting fitted parameters individually for each of anisotropy effect and heterogeneity effect on the computer monitor to create a filter from fitted parameter sets for each of the anisotropy effect and the heterogeneity effect. The method may further comprise applying the filter to the visually depicted slowness image to produce a resultant image displayed on the computer monitor, wherein the resultant image illuminates one of the anisotropy effect and the heterogeneity effect.

In another embodiment, a method is described. The method may comprise visually depicting a slowness image on a computer monitor and choosing an azimuthal periodicity value. The method may also comprise constructing a spatial filter based on the chosen azimuthal periodicity band and applying the spatial filter to the slowness image on the computer monitor. The method may further comprise constructing a filtered image on the computer monitor after the applying the spatial filter and subtracting the filtered image from the slowness image to produce a resultant image wherein the resultant image is not affected by the azimuthal periodicity value. The method may also comprise displaying the resultant image on a computer monitor.

In another embodiment, a method is disclosed. The method may comprise creating a slowness image from geological data obtained from an acoustic survey on a computer monitor and selecting an azimuthal periodicity value for analysis. The method may also comprise constructing a spatial filter based on the chosen azimuthal periodicity value and applying the spatial filter to the slowness image on the computer monitor to produce filtered data. The method may also comprise constructing a filtered image on the computer monitor from the filtered data, subtracting the filtered image from the slowness image to produce a resultant image and displaying the resultant image on a computer monitor.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not to be considered limiting of its scope, for the disclosure may admit to other equally effective embodiments.

Figure 1:
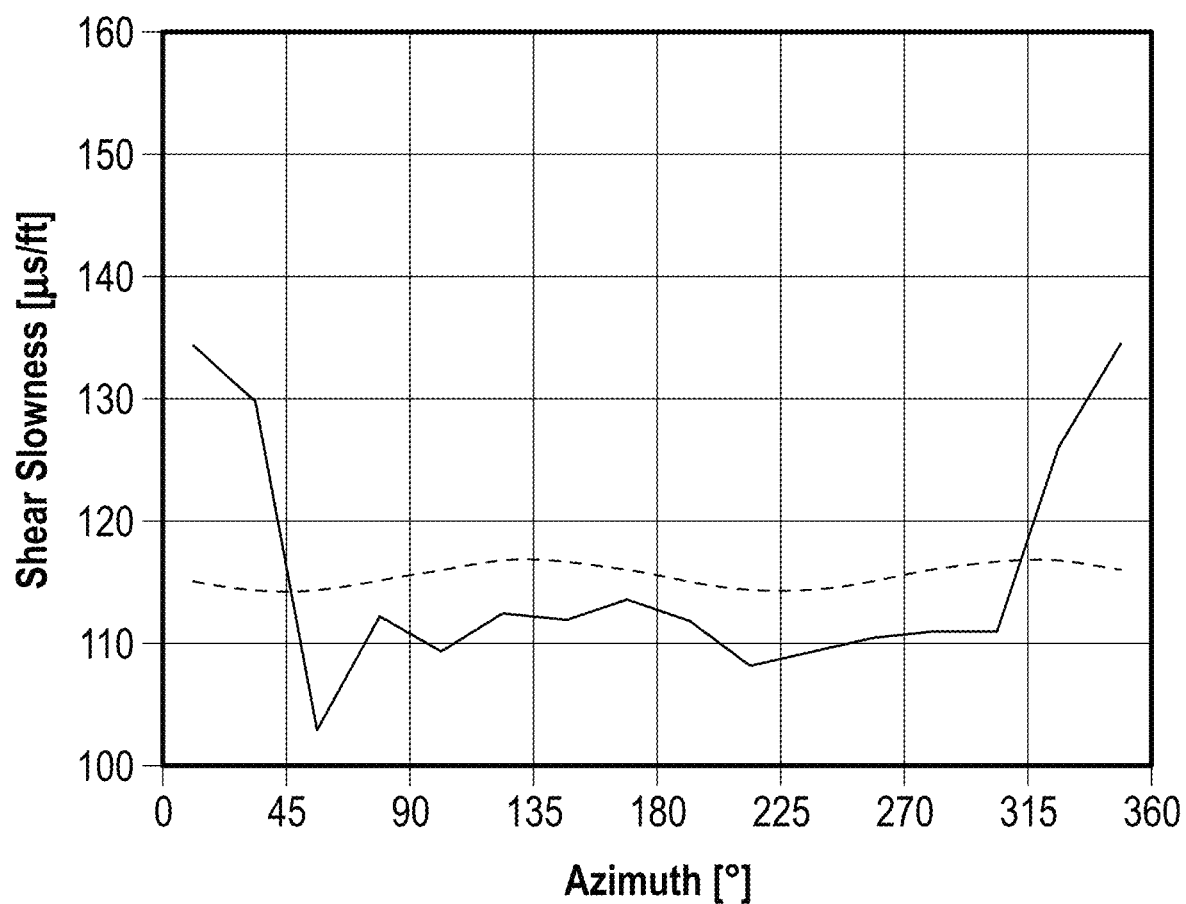
FIG. 1 is a graph of heterogenous depth for a wellbore.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and shall not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

In one aspect of the disclosure, a method is presented to evaluate anisotropic intensity of data from an acoustic data set. Acoustic data is obtained from a device or a series of devices that have a transmitter of acoustic energy and receiver for the transmitted acoustic energy. The energy is transmitted/beamed into geological stratum and reflections are received at the receiver. The data can then be presented in various forms to show structures encountered by the energy as the energy propagated through the strata.

Next, it may be noticed that the returning waves received at the receiver shows periodic variation as a function of borehole azimuth. Variations in the returning slowness waves can be evaluated on a consistent basis at specific depths. The periodicity can be determined through a fitted mathematical function. In other embodiments, since a periodicity is noted, other known mathematical functions can be used in evaluation, such as a square wave functions.

In embodiments, following the evaluation of the periodicity of slowness variation, slowness variation is then evaluated. Taking a periodicity of representative values (for example at 180 degrees and 360 degrees), slowness variation can be evaluated with the fitting of the mathematical functions previously performed.

In embodiments, following the evaluation of the phase shift of slowness variation, minimum and maximum slowness value azimuth are evaluated. Those values correspond to the anisotropy axis in anisotropic formations.

Anisotropy effect and heterogeneity effect may then be visualized with the fitted parameters. Thereafter, a filter may be applied to illuminate one factor (either anisotropy or heterogeneity) using the fitted curves. The result allows for identification of a separated set of data for use by an operator.

Figure 2:
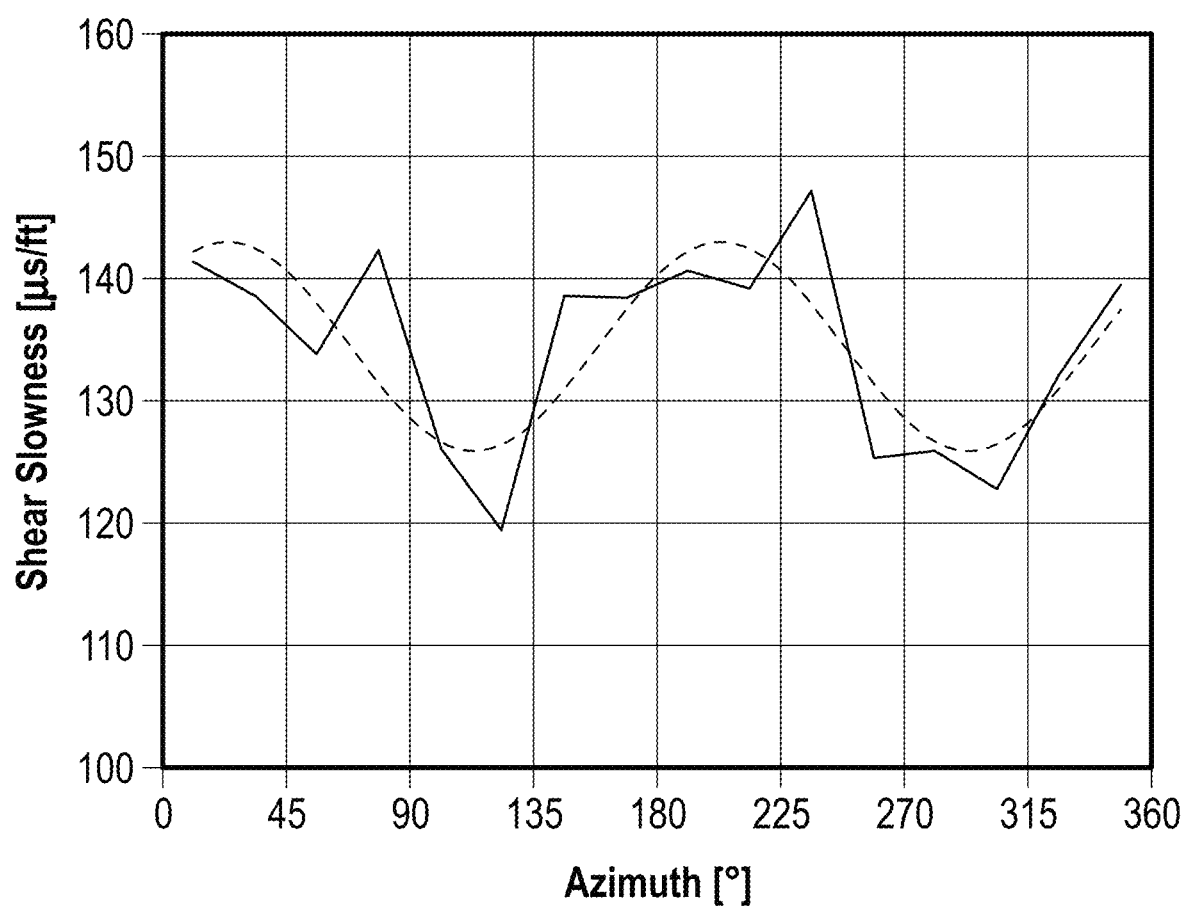
FIG. 2 is a graph of anisotropic depth with fitted results.

For illustration, an example of an analysis is performed. Referring to FIG. 1, data from heterogenous depth is illustrated from 0 degrees to 360 degrees by the heavy line. An attempted fitting of periodicity at 180 degrees does not provide a good fitting result compared to the data. Referring to FIG. 2, the dark line represents anisotropic depth over the 0 degree to 360 degree interval. This data is more closely matched by the 180 degree periodicity (non-heavy line) and may be used more effectively than that put in FIG. 1.

Figure 3:
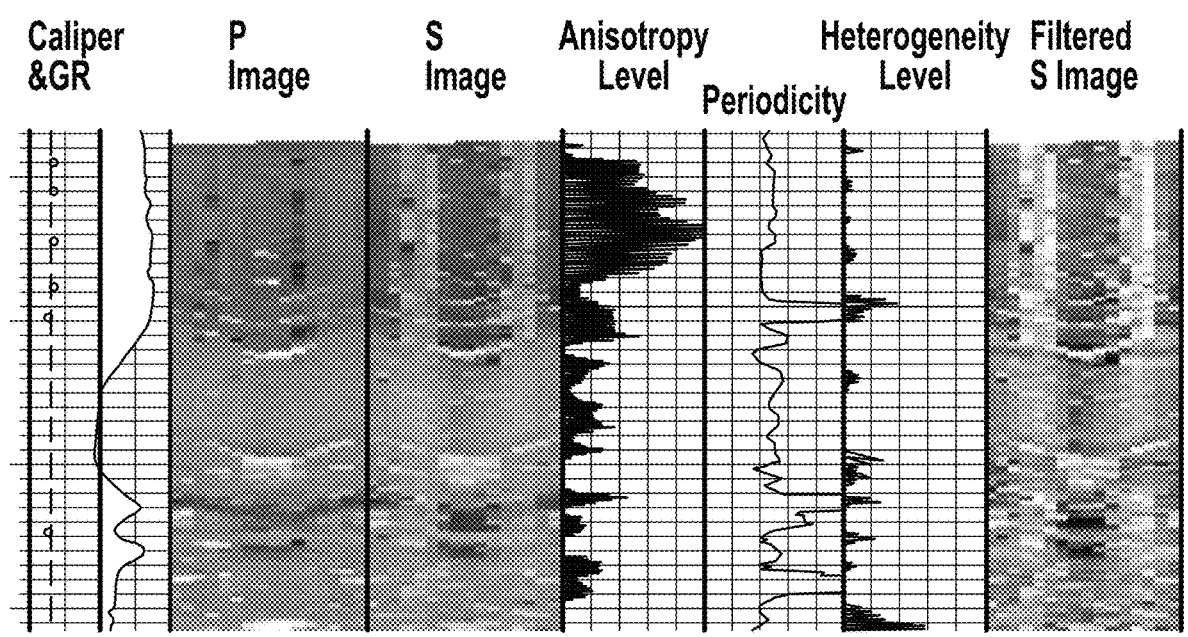
FIG. 3 is a composite image providing a P image, S image, Anisotropy level, periodicity, heterogeneity level and filtered image.

Referring to FIG. 3, a composite image is produced for evaluation. At the left of the FIG. 3, caliper values (gamma ray data) are illustrated that vary down the FIG. Next, a P image, or primary wave image is illustrated. Next to the primary wave image, an S image, or secondary wave image is illustrated. To the right of the secondary wave image, anisotropy levels are illustrated. This data shows the normalized range of the slowness values fitted from a mathematical function. Progressing right, periodicity and heterogeneity are illustrated. The periodicity equal to 180 can suggest formation is dominated by anisotropy or specific formation layering that shows 180 degree periodicity. Finally, a filtered secondary wave image is produced. The filtered secondary wave image at the right of the figure shows significant variation to the unfiltered secondary wave image at the center of the figure. For the composite image, such evaluation may be conducted at each depth of slowness image and a composite log to separately address anisotropy and heterogeneity effects. The fitted parameters can be utilized to apply image filtering to illuminate one of the factors.

Figure 4:
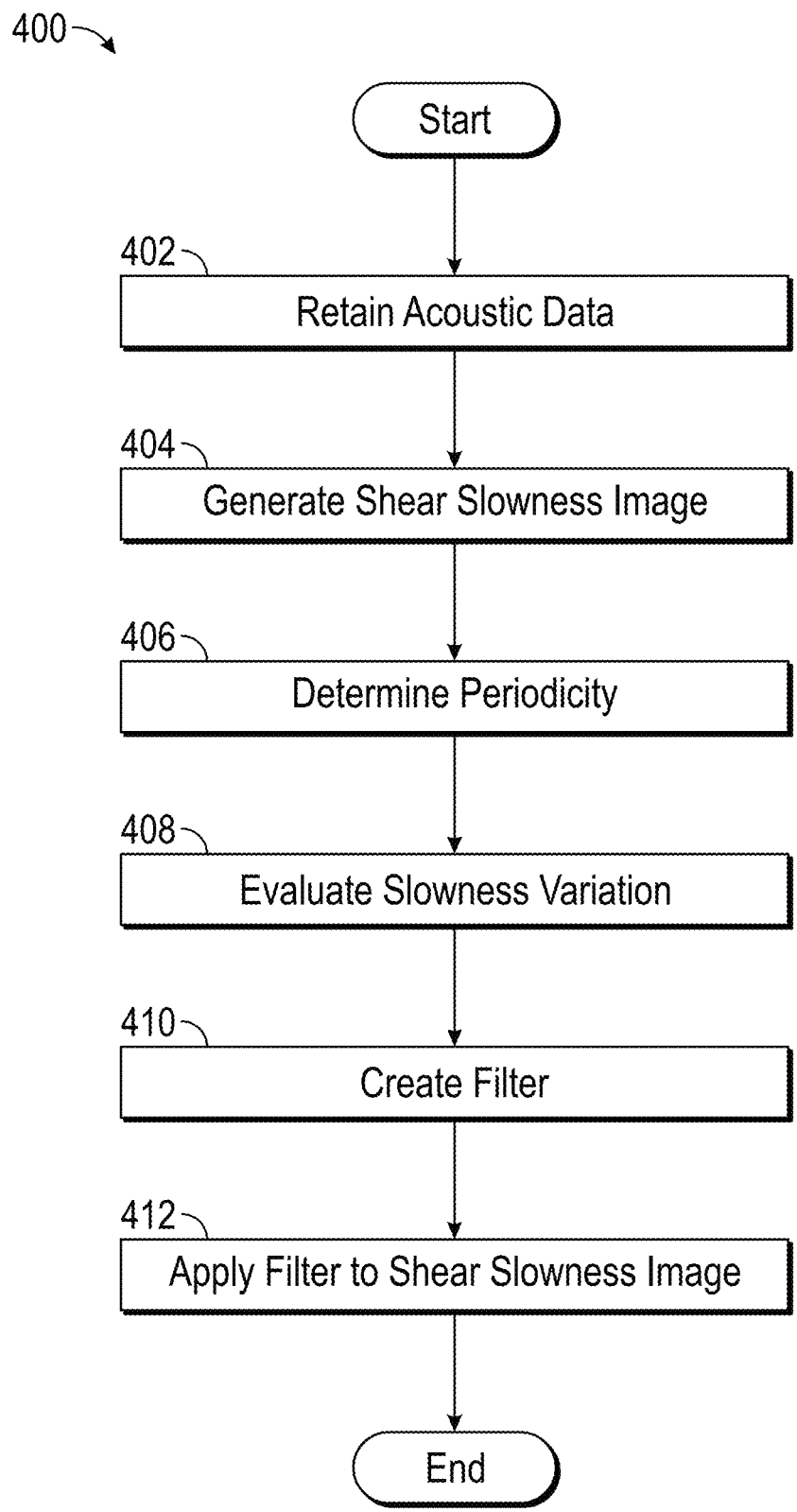
FIG. 4 is a method of producing an image produced by sound based data using a filter produced by at least one fitted curve.

Referring to FIG. 4, a method 400 of performing a separate evaluation of acoustic anisotropy and heterogeneity is illustrated. At 402, data from an acoustic survey is retained. At 404, a slowness image is generated from the data. At 406, periodicity and phase shift of slowness variation at each depth of the image is performed or evaluated. A mathematical function, such as a sinusoidal curve, may be used. At 408, an evaluation of slowness variation of the data is performed. Representative values at specific angles may be used for the slowness variation evaluation. At 410, a filter is created by visualizing fitted parameters for a separately analyzed anisotropy effect and heterogeneity effect. At 412, the filter is applied to the slowness image to illuminate one of the anisotropy effect and heterogeneity effect.

In other embodiments, evaluation of data may occur without the need for periodicity evaluations as described above. In some instances, periodicity evaluation may lead to inaccurate analysis, therefore alternative method steps may be used. As described above, data obtained from ultrasonic evaluation may include some deviation from a specified periodicity. Fitting methods may be affected by outlier data which can be caused by heterogeneity of formations.

To solve these problems, aspects of the disclosure also evaluate the slowness image with applying a "bandpass" spatial filter based on azimuthal periodicity. The "bandpass" spatial filter can be designed to extract or remove certain angular periodicity applied to the slowness data as a function of azimuth acquired at each depth. For example, at 180 degree periodicity, the filter is effective when there is anisotropy.

In embodiments, a slowness image may be constructed, similar to the embodiments described above. Next, an azimuthal periodicity ban may be used to construct a spatial filter. As an example, an anisotropy evaluation may be conducted at a center angle of 180 degrees. The spatial filter determined above may be applied to the slowness image at least depth to construct a filtered image. The filtered image can then be subtracted from the original image to evaluate the slowness image to produce a resultant image that is not affected by the specified angular periodicity.

Figure 5:
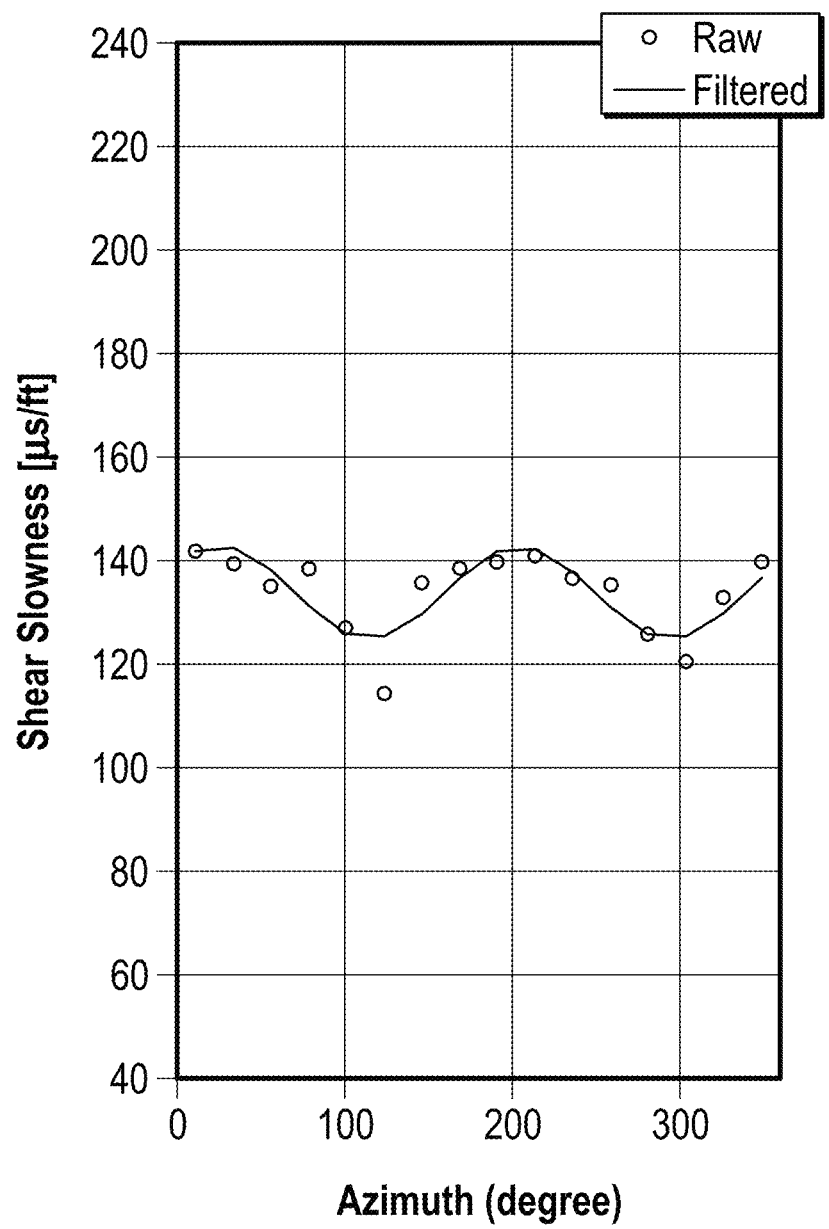
FIG. 5 is a slowness graph obtained from acoustic data.
Figure 6:
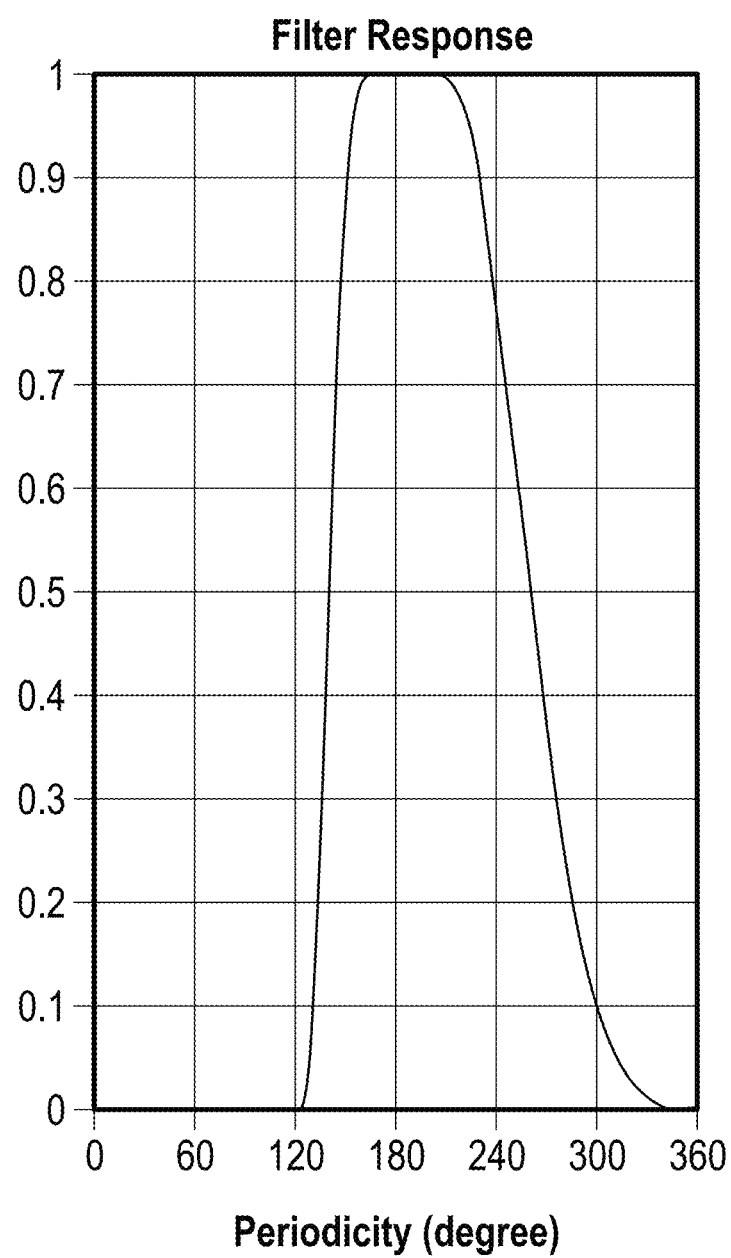
FIG. 6 is a graph of the spatial filter used for FIG. 5

Example data is explained next for this embodiment. Referring to FIG. 5, data from a slowness image is illustrated. The evaluation occurs at a depth where acoustic anisotropy is expected. Circular areas show slowness values prior to applying a bandpass filter as described above. Referring to FIG. 6, with the bandpass filter centered at 180 degrees, a slowness curve that has been bandpass filtered is shown.

Figure 7:
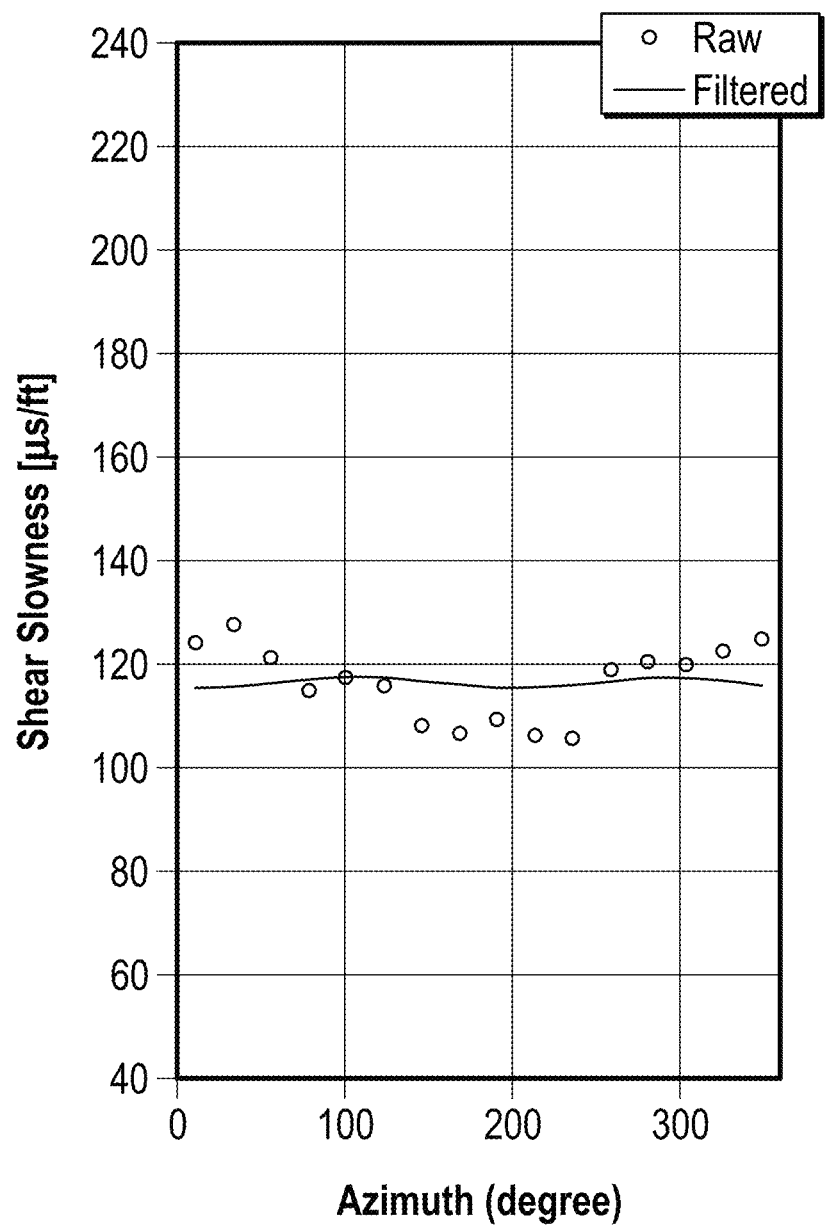
FIG. 7 is a graph of raw slowness data.
Figure 8:
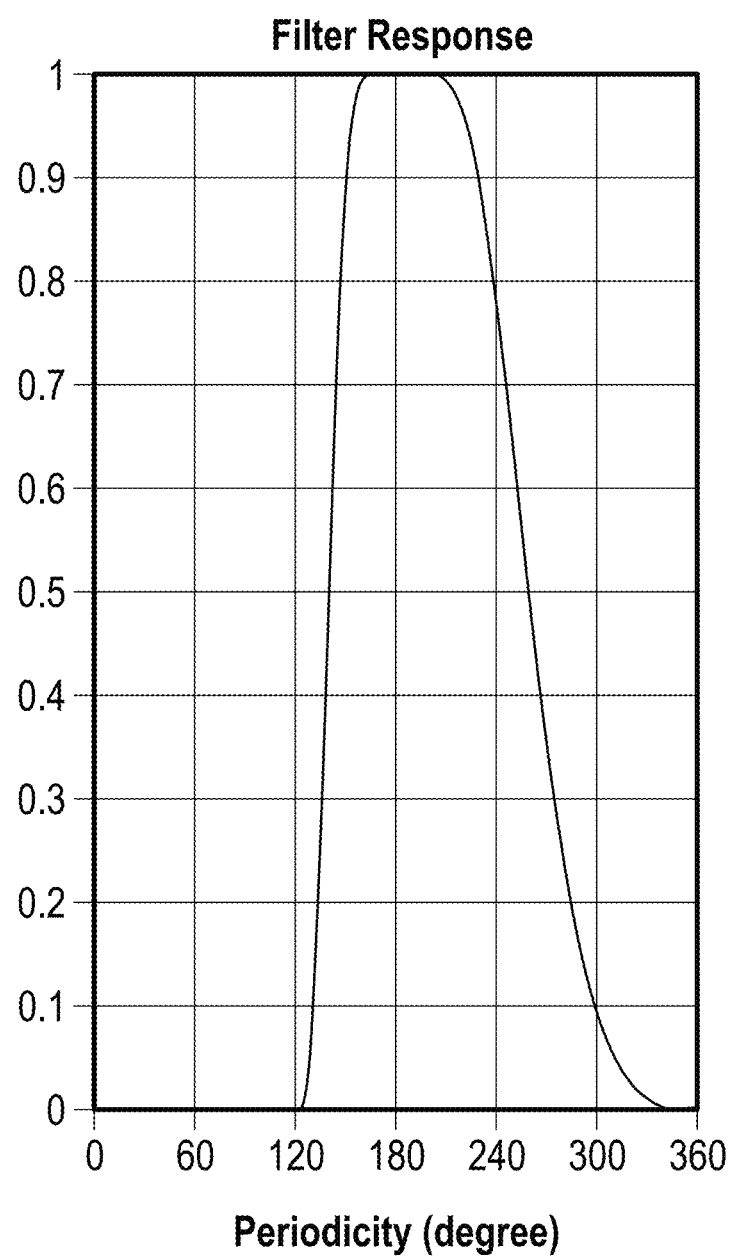
FIG. 8 is a graph of the spatial filteri used for FIG. 6.

Referring to FIG. 7, circular areas show slowness of received data. As can be seen, the slowness numbers vary according to azimuthal degree. With a bandpass filter centered at 180 degrees shown in FIG. 8, a spatial filter centered at 180 degrees, a spatial filtered slowness curve is illustrated. As there is almost no periodicity at 180 degrees, the filtered curve shows a rather flat curve that indicates a small effect of anisotropy.

Figure 9:
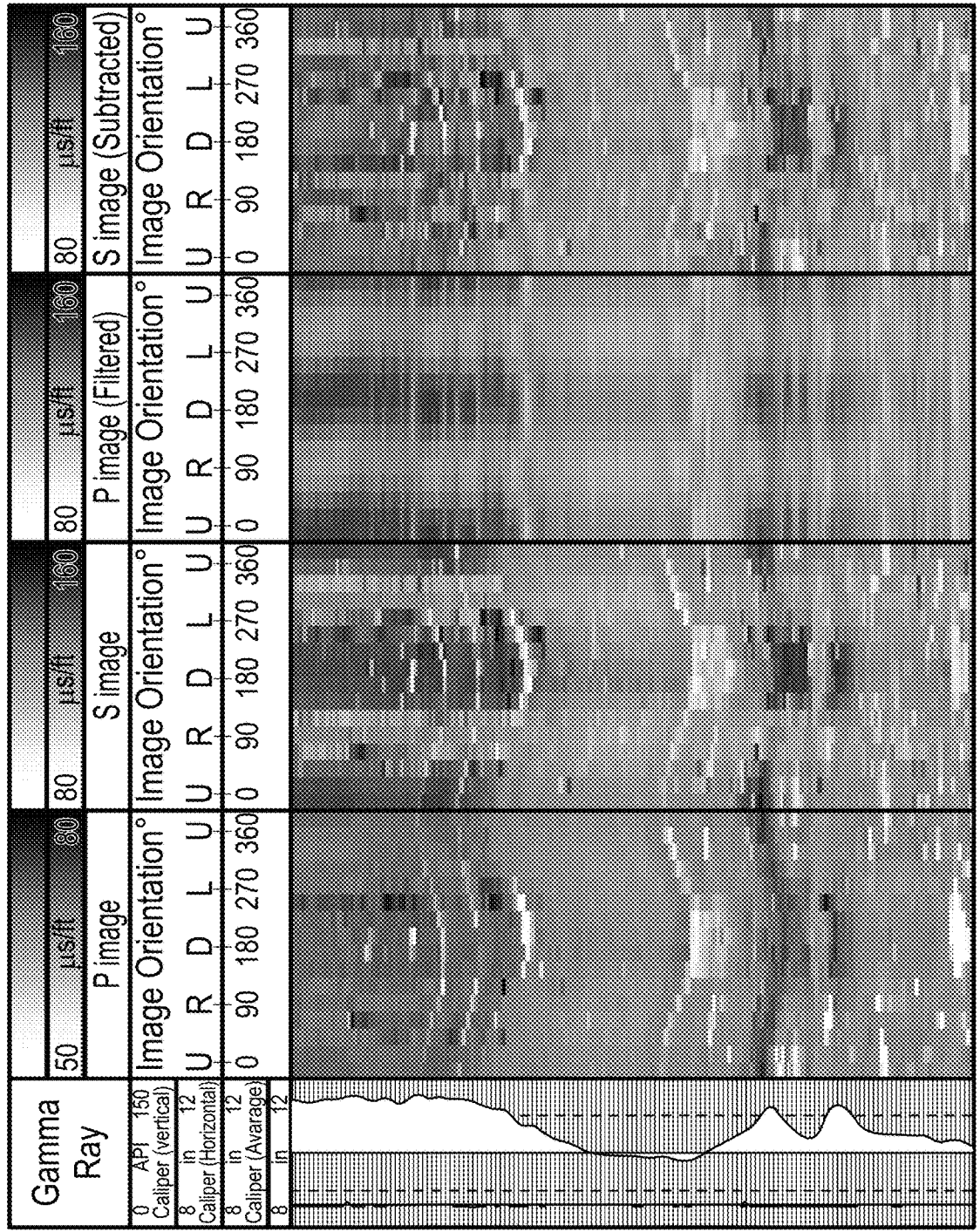
FIG. 9 is a composite image providing a P image, S image, filtered S image and an image of the S image subtracting out the filtered S image.

Referring to FIG. 9, a series of graphs of data are illustrated. Vertical section 1 presents data from gamma ray analysis. Vertical section 2 presents a compressional slowness image. Vertical section 3 presents a slowness image. Vertical section 4 presents an angular bandpass filtered slowness image for 180 degree periodicity. Vertical section 5 is a processed image of the slowness image minus the angular bandpass filtered slowness image at 180 degree periodicity.

Figure 10:
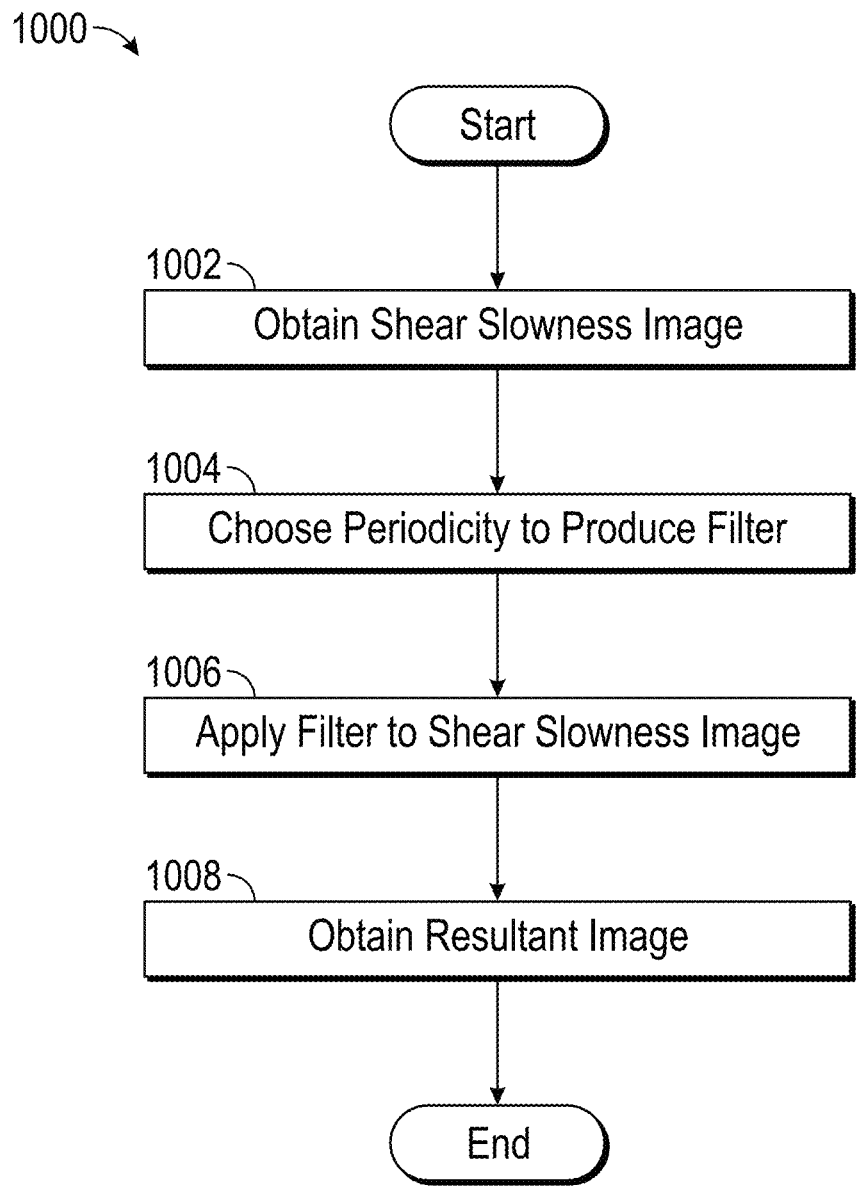
FIG. 10 is a method of producing an image produced by sound based data using a filter that subtracts visual data from an S image.

Referring to FIG. 10, a method 1000 of producing a filtered image for geological stratum data is disclosed for this embodiment. At 1002, the method includes obtaining slowness image data. The data may be from ultrasonic in nature, in one embodiment. A periodicity may be determined by a user upon which to construct a spatial filter, at 1004. At 1006, the filter may be applied to each portion of data of the slowness image to construct a filtered image. At 1008, the filtered image may be subtracted from the slowness image data providing a resultant image that is not affected by a specified angular periodicity.

Aspects of the disclosure also provide methods that may be performed to achieve a stated goal, including controlling components described in the specification. In some embodiments, the methods described may be performed by circuits and/or computers that are configured to perform such tasks.

Figure 11:
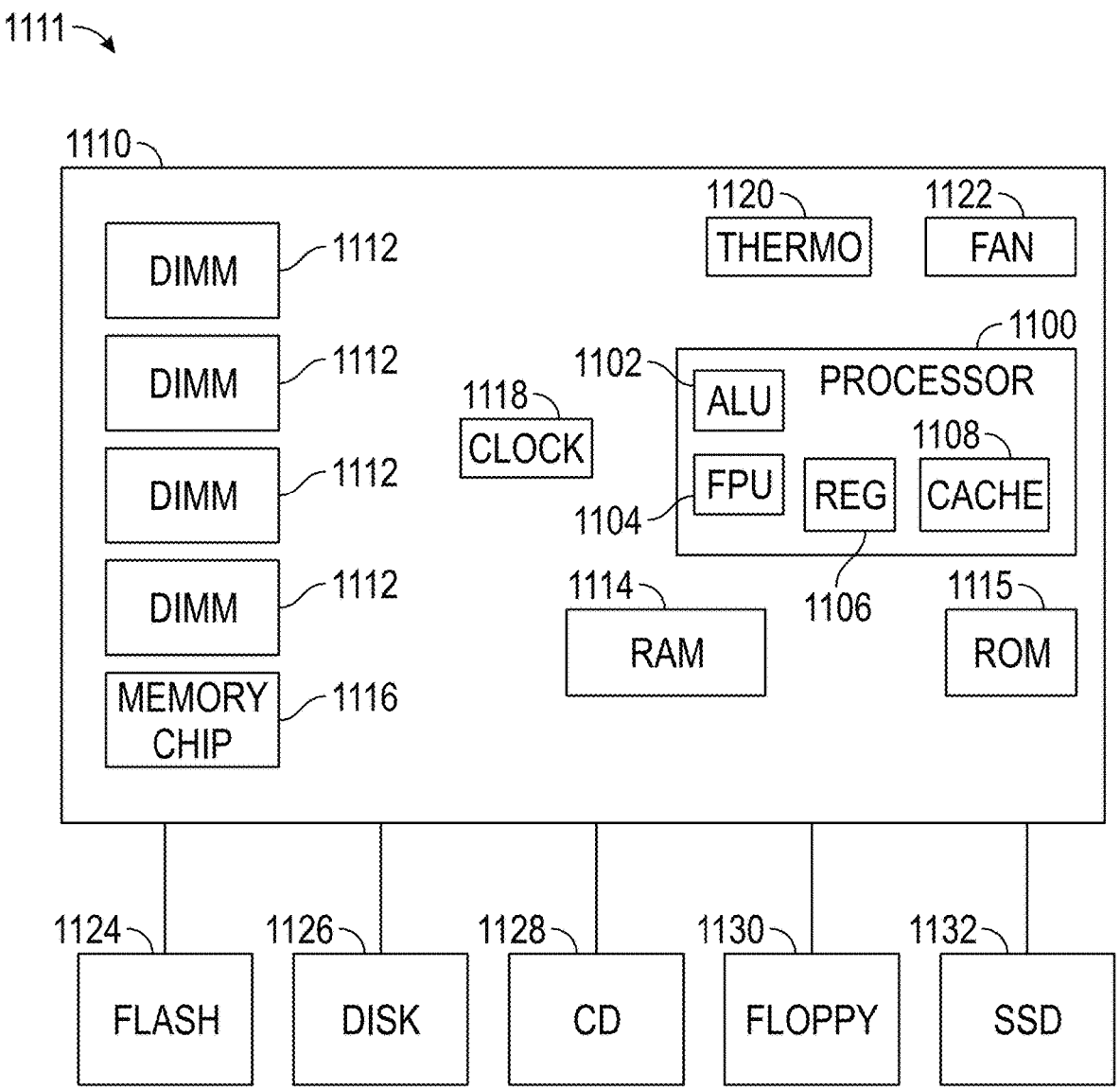
FIG. 11 is an arrangement to perform the methods of FIG. 4 and/or FIG. 10.

In such embodiments, referring to FIG. 11, a computing apparatus 1110 is used to perform the analysis. In FIG. 11, a processor 1100 is provided to perform computational analysis for instructions provided. The instructions provided, code, may be written to achieve the desired goal and the processor 1100 may access the instructions. In other embodiments, the instructions may be provided directly to the processor 1100. The instructions may be in the form of analyzing video data and augmenting video data as described above in relation to FIG. 4 and FIG. 10.

While certain embodiments call for use of a processor 1100, in other embodiments, components may be substituted for generalized processors. These components, known as application specific integrated circuits ("ASICs") are designed to perform the desired task of evaluation and display of the data. As such, the ASIC's generally have a smaller footprint than generalized computer processors. The ASIC's, when used in embodiments of the disclosure, may use field programmable gate array technology, that allows a user to make variations in computing, as necessary. Thus, the methods described herein are not specifically held to a precise embodiment, rather alterations of the programming may be achieved through these configurations.

In embodiments, when equipped with a processor 1100, the processor 1100 may have arithmetic logic unit ("ALU") 1102, a floating point unit ("FPU") 1104, registers 1106, and a single or multiple layer cache 1108. The ALU 1102 may perform arithmetic functions as well as logic functions. The FPU 1104 may be math coprocessor or numeric coprocessor to manipulate numbers more efficiently and quickly than other types of circuits. The embodiments may also provide for registers 1106 that are configured to store data that will be used by the processor during calculations and supply operands to the arithmetic unit and store the result of operations. In embodiments, single or multiple layer caches 1108 are provided as a storehouse for data to help in calculation speed by preventing the processor 1100 from continually accessing random access memory ("RAM") 1114.

Aspects of the disclosure provide for the use of a single processor 1100. Other embodiments of the disclosure allow the use of more than a single processor. Such configurations may be called a multi-core processor where different functions are conducted by different processors to aid in calculation speed. In yet other embodiments, discrete configurations may use separate processors 1100. In embodiments, when different processors are used, calculations may be performed simultaneously by different processors, a process known as parallel processing.

A motherboard 1110 may allow for connection of the processor 1100 to other electrical components. In one non-limiting embodiment, the motherboard 1110 is a printed circuit board that allows the processor 1100 to be attached to the motherboard 1110 as well as other components helpful in processing. Such components may be, as a non-exhaustive list, as memory modules ("DIMMS") 1112, random access memory 1114, read only memory 1115, non-volatile memory chips 1116, a clock generator arrangement 1118 that keeps components in synchronization, as well as connectors for connecting other components to the motherboard 1110. The motherboard 1110 may have different sizes according to the needs of the computer architect.

The motherboard 1110 may also provide other services to aid in functioning of the processor, such as cooling capacity. Cooling capacity may include a thermometer 1120 and temperature-controlled fan 1122 that conveys cooling air over the motherboard 1110 to reduce temperature.

Data stored for execution by the processor 1100 may be stored in several locations. These location may include the random access memory 1114, read only memory 1115, flash memory 1124, computer hard disk drives 1126, compact disks 1128, floppy disks 1130 and solid state drives 1132. For booting purposes, data may be stored in an integrated chip called an EEPROM, that is accessed during start-up of the processor. The data, known as a Basic Input/Output System ("BIOS"), contains, in some example embodiments, an operating system that controls both internal and peripheral components.

Different components may be added to the motherboard or may be connected to the motherboard to enhance processing. Examples of such connections of peripheral components may be video input/output sockets, storage configurations (such as hard disks, solid state disks, or access to cloud based storage), printer communication ports, enhanced video processors, additional random access memory and network cards.

The processor and motherboard may be provided in a discrete form factor, such as personal computer, cellular telephone, tablet, personal digital assistant or other component. The processor and motherboard may be connected to other such similar computing arrangement in networked form. Data may be exchanged between different sections of the network to enhance desired outputs. The network may be a public computing network or may be a secured network where only authorized users or devices may be allowed access.

As will be understood, method steps for completion may be stored in the random access memory, read only memory, flash memory, computer hard disk drives, compact disks, floppy disks and solid state drives.

Different input/output devices may be used in conjunction with the motherboard and processor. Input of data may be through a keyboard, voice, Universal Serial Bus ("USB") device, mouse, pen, stylus, Firewire, video camera, light pen, joystick, trackball, scanner, bar code reader and touch screen. Output devices may include monitors, printers, headphones, plotters, televisions, speakers and projectors.

In one embodiment, a method is disclosed. The method may comprise visually depicting a slowness image on a computer monitor, wherein the slowness image has a series of depths and calculating a periodicity and a phase shift of slowness variation at each of the depths of the slowness image. The method may further comprise calculating a slowness variation of the slowness image and visually depicting fitted parameters individually for each of anisotropy effect and heterogeneity effect on the computer monitor to create a filter from fitted parameter sets for each of the anisotropy effect and the heterogeneity effect. The method may further comprise applying the filter to the visually depicted slowness image to produce a resultant image displayed on the computer monitor, wherein the resultant image illuminates one of the anisotropy effect and the heterogeneity effect.

In another embodiment, the method may be performed wherein the constructing the slowness image comprises creating a visual image.

In another embodiment, the method may be performed wherein data obtained from an acoustic survey is used for the constructing the slowness image.

In another embodiment, the method may be performed wherein the calculating the slowness variation occurs by fitting a mathematical function to data in the slowness image.

In another embodiment, the method may be performed wherein the mathematical function is a square wave.

In another embodiment, the method may be performed wherein the mathematical function is a sinusoidal curve.

In another embodiment, the method may be performed wherein the calculating the slowness variation of the slowness image is performed at 180 degrees.

In another embodiment, the method may be performed wherein the calculating the slowness variation of the slowness image is performed at 360 degrees.

In another embodiment, a method is described. The method may comprise visually depicting a slowness image on a computer monitor and choosing an azimuthal periodicity value. The method may also comprise constructing a spatial filter based on the chosen azimuthal periodicity band and applying the spatial filter to the slowness image on the computer monitor. The method may further comprise constructing a filtered image on the computer monitor after the applying the spatial filter and subtracting the filtered image from the slowness image to produce a resultant image wherein the resultant image is not affected by the azimuthal periodicity value. The method may also comprise displaying the resultant image on a computer monitor.

In another example embodiment, the method may be performed wherein the depicted slowness image is generated from ultrasonic data.

In another example embodiment, the method may be performed wherein the ultrasonic data is obtained from a geological survey.

In another example embodiment, the method may be performed wherein data for the slowness image is from pitch-catch waveforms.

In another example embodiment, the method may be performed wherein the choosing an azimuthal periodicity value is 180 degrees.

In another embodiment, a method is disclosed. The method may comprise creating a slowness image from geological data obtained from an acoustic survey on a computer monitor and selecting an azimuthal periodicity value for analysis. The method may also comprise constructing a spatial filter based on the chosen azimuthal periodicity value and applying the spatial filter to the slowness image on the computer monitor to produce filtered data. The method may also comprise constructing a filtered image on the computer monitor from the filtered data, subtracting the filtered image from the slowness image to produce a resultant image and displaying the resultant image on a computer monitor.

In another example embodiment, the method may be performed wherein the resultant image is not affected by the azimuthal periodicity value.

In another example embodiment, the method may be performed wherein the selecting the azimuthal periodicity value for analysis is chosen by a user.

In another example embodiment, the method may be performed wherein data for the slowness image is from pitch-catch waveforms.

In another example embodiment, the method may be performed wherein the acoustic survey has ultrasonic data.

In another example embodiment, the method may be performed wherein the acoustic survey has non-ultrasonic data.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method, comprising:
    visually depicting a slowness image on a computer monitor, the slowness image including a log of slowness values at a plurality of depths of a wellbore and a plurality of azimuth angles about a periphery of the wellbore;
    calculating a periodicity and a phase shift of slowness variation at each of the plurality of depths of the slowness image;
    fitting a periodic function having said calculated periodicity and phase shift to the log of slowness values to calculate a slowness variation fitted parameter at each of the plurality of depths of the slowness image;
    visually depicting said fitted parameters individually for each of anisotropy effect and heterogeneity effect on the computer monitor to create a filter from fitted parameter sets for each of the anisotropy effect and the heterogeneity effect; and
    applying the filter to the visually depicted slowness image to produce a resultant image displayed on the computer monitor, wherein the resultant image illuminates one of the anisotropy effect and the heterogeneity effect.

2. The method according to claim 1, wherein the slowness values at the plurality of depths and the plurality of azimuth angles are obtained from an acoustic survey.

3. The method according to claim 1, wherein the fitted parameters are used to quantify the anisotropy and heterogeneity intensity.

4. The method according to claim 1, wherein the periodic function is a sinusoidal curve.

5. The method according to claim 1, wherein the periodicity is one of 180 degrees and 360 degrees.

6. The method according to claim 1, wherein the slowness image is obtained from an ultrasonic logging operation.

7. A method, comprising:
    visually depicting a slowness image on a computer monitor, the slowness image including a log of slowness values at a plurality of depths of a wellbore and a plurality of azimuth angles about a periphery of the wellbore;
    choosing an azimuthal periodicity value and center angle;
    constructing a bandpass spatial filter based on the chosen azimuthal periodicity value and center angle, wherein the filter includes a filter response as a function of azimuth angle;
    applying the bandpass spatial filter to the slowness image on the computer monitor at each of the plurality of depths of the slowness image;
    constructing a filtered image on the computer monitor after the applying the bandpass spatial filter;
    subtracting the filtered image from the slowness image to produce a resultant image wherein the resultant image is not affected by the azimuthal periodicity value; and
    displaying the resultant image on a computer monitor.

8. The method according to claim 7, wherein the depicted slowness image is generated from ultrasonic data.

9. The method according to claim 8, wherein the ultrasonic data is obtained from a geological survey.

10. The method according to claim 7, wherein data for the slowness image is from pitch-catch waveforms.

11. The method according to claim 7, wherein the choosing an azimuthal periodicity value is chosen by a user.

12. The method according to claim 7, wherein the azimuthal periodicity value is chosen to equal 180 degrees.

13. A method, comprising:
    creating a slowness image on a computer monitor, the slowness image generated from geological data obtained from an acoustic survey and including a log of slowness values at a plurality of depths of a wellbore and a plurality of azimuth angles about a periphery of the wellbore;
    selecting an azimuthal periodicity value and center angle for analysis;
    constructing a spatial filter based on the selected azimuthal periodicity value and center angle;
    applying the spatial filter to the slowness image on the computer monitor to produce filtered data;
    constructing a filtered image on the computer monitor from the filtered data;
    subtracting the filtered image from the slowness image to produce a resultant image; and
    displaying the resultant image on a computer monitor.

14. The method according to claim 13, wherein the resultant image is not affected by the azimuthal periodicity value.

15. The method according to claim 13, wherein the selecting the azimuthal periodicity value range for analysis is chosen by a user.

16. The method according to claim 13, wherein the acoustic survey has ultrasonic data.

17. The method according to claim 13, wherein the acoustic survey has non-ultrasonic data.

* * * * *